United States Patent [19]
Blount

[11] 4,115,635
[45] Sep. 19, 1978

[54] PROCESS FOR THE PRODUCTION OF POLY (ALLYL HALIDE ALLYL ALCOHOL) POLYMER

[76] Inventor: David H. Blount, 5450 Lea St., San Diego, Calif. 92105

[21] Appl. No.: 858,112

[22] Filed: Dec. 7, 1977

Related U.S. Application Data

[63] Continuation-in-part of Ser. No. 757,239, Jan. 6, 1977, Pat. No. 4,069,391, which is a continuation of Ser. No. 622,525, Oct. 15, 1975, Pat. No. 4,020,259.

[51] Int. Cl.² .............. C08G 77/00; C08G 77/02; C08F 2/00; C08F 16/08
[52] U.S. Cl. .............................. 526/29; 526/17; 526/47; 526/72; 526/271; 526/291; 526/292
[58] Field of Search .............. 526/11.1, 292, 291, 526/194, 17, 29, 47, 72, 279

[56] References Cited

U.S. PATENT DOCUMENTS

| 2,443,741 | /1948 | Kropa | 526/11.1 |
| 2,455,722 | 12/1948 | Adelson et al. | 526/11.1 |

Primary Examiner—Herbert J. Lilling

[57] ABSTRACT

Allyl halides are polymerized by alkali metal silicates and alkaline earth metal silicates to produce poly (allyl halide allyl alcohol) polymers.

10 Claims, No Drawings

PROCESS FOR THE PRODUCTION OF POLY (ALLYL HALIDE ALLYL ALCOHOL) POLYMER

CROSS-REFERENCE TO RELATED APPLICATIONS

This application is a continuation-in-part of my copending U. S. Pat. Application, Ser. No. 757,239, filed Jan. 6, 1977 now U.S. Pat. No. 4,069,391, which is a continuation of Ser. No. 622,525 U.S. Pat No. 4,020,259.

BACKGROUND OF THE INVENTION

This invention relates in general to the process for the polymerization of allyl halides by using alkali metal silicates and alkaline earth metal silicates to react chemically with the halide, thereby producing a silicon acid which acts as a catalyst to polymerize the allyl halide, thereby producing poly (allyl halide allyl alcohol) polymers.

Various alkali metal silicates may be used in this invention such as sodium silicate, potassium silicate, and lithium silicate. Sodium silicate is the preferred alkali metal silicate due to its low cost and availability.

Various alkaline earth metal silicates may be used in this invention such as calcium silicate, magnesium silicate, cadmiun silicate, barium silicate, zinc silicate, barium silicate and mixtures thereof. Calcium silicate is the most useful alkaline earth metal silicate.

Various natural occuring silicates which contain an alkali compound and silicic acid may be used in this invention such as lead silicates, talc, asbestos, natrolite, garnet, mica, Kaolin, clay, feldspar, beryl silica, etc. and mixtures thereof. If the natural occuring silicates do not have an active silicic acid radical present, they may be washed with a dilute mineral acid to produce an active silicic acid radical. Silica may be heated in a dilute aqueous alkali metal hydroxide such as sodium hydroxide and potassium hydroxide in the ratio of 0.5 to 1 or 1 to 1 mols until the water evaporates, thereby producing a mono alkali metal silicate and an activated silica of an unknown chemical formula. For the purpose of this invention, the mixture will be known as "activated silica".

A combination of an alkali metal silicate, such as sodium silicate or potassium silicate and hydrated silica or silicoformic acid may be used in this invention. In U.S. Pat. No. 4,020,259 silicic acid in an alkali metal hydroxide aqueous solution is utilized to produce poly (allyl alcohol) polymer and poly (allyl chloride allyl alcohol) polymer.

Allyl halides may be produced by the addition of a halide to propylene. Methallyl halide may be produced by the addition of a halide to isobutylene. Other compounds with the combination -C=C—C', which is known as the allylic system, may be used. Allyl chloride is the preferred allyl halide. Various mono-olefinic allyl type mono-halide with the essential grouping of atoms which may be represented as

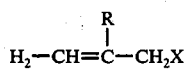

wherein R is a hydrogen or a $C_1$ to $C_4$ alkyl group wherein X represents a halogen atom may be used. Furthermore, these compounds contain only one olefinic group of which one of the unsaturated carbon atoms contain at least one hydrogen atom per molecule.

Representive examples of mono-olefinic allyl type mono-halides are such compounds as allyl chloride, allyl bromide, crotyl chloride, crotyl iodide, beta-methylallyl chloride, beta-methylallyl bromide, methyl vinyl carbinyl chloride, methyl vinyl carbinyl fluoride, alpha-dimethylallyl chloride, beta-cyclohexylallyl choride, cinnamyl chloride, beta-ethylcrotyl chloride, beta-phenylallyl bromido, alpha-dicyclohexylallyl chloride, beta-propylallyl iodide, beta-phenyl-allyl chloride, beta-cyclohexylallyl fluoride, 2 chloromethyl butene-1, 2-chloromethyl pentene-1, 2-chloromethyl hexene-1 and mixtures thereof.

Poly (allyl halide allyl alcohol) polymer, for the purpose of this invention will be the general name given the various polymers produced by this invention.

Poly (allyl halide allyl alochol) polymer may be chemically reacted with an alkali compound such as alkali metal hydroxides, oxides and carbonates to produce poly (allyl alcohol) polymers. The poly (allyl halide allyl alcohol) polymers and poly (allyl alcohol) polymers may be chemically reacted with a hydrated silicate in the presence of an alkali catalyst to produce a poly (allyl silicate allyl alcohol) polymer.

The poly (allyl halide allyl alcohol) polymers and poly (allyl alcohol) polymers may be used as adhesives, coating agents, impregnants, molding powders, in paints, in varnishes, in laminates and as an intermediate in resin production.

Poly (allyl halide allyl alcohol) polymers and poly (allyl alcohol) polymers will react chemically with dicarboxylic acids and dicarboxylic anhydrides to produce polyester resins. They will react chemically with poly-diisocyanate compounds and urethane prepolymers to produce resins and foams. They will react chemically with epoxy compounds and epoxy resins to produce resins and foams.

By using this process, allyl halide compounds may be copolymerized with other polymerable organic compounds such as allyl halides amines, epoxy compounds, isocyanates, acrylic compounds, acrylate compounds, vinyl compounds, diene compounds, allyl alcohol, aldehydes, ketones, diallylic maleates and mixtures thereof.

Allyl halide compounds may be copolymerized by this process with polymerable organic compounds to produce aqueous emulsions by using a peroxide or a redox system. Allyl halides may be copolymerized with vinyl monomers such as vinyl chloride, vinyl acetate, acrylonitrite, acrylic acid, methacrylic acid, methyl acrylate, methyl methacrylate, vinylidene chloride, styrene and mixtures thereof to produce poly (vinyl allyl halide allyl alcohol) copolymers. Allyl halide will copolymerize with organic dienes such as isoprene, chloroprene and butadiene by using a redox system with this process to produce poly (diene allyl halide allyl alcohol) polymers.

SUMMARY OF THE INVENTION

The chemical reactions of this invention may take place under any suitable physical conditions. While many of the reactions will take place acceptably at ambient temperature and pressure, in some cases, better results may be obtained at somewhat elevated temperatures and pressure. Preferably the reaction takes place at a temperature between 0° and 100° C in a closed system. The reaction time to produce poly (allyl chloride allyl alcohol) polymers is quite varied. The reaction time is shortened by an elevated temperature and an increase in the amount of catalyst used. At ambient temperature, about 70 to 90% of the allyl chloride is polymerized in about 1 to 12 hours. The poly (allyl chloride allyl alcohol) polymer will form an emulsion in water and then gradually separate out as a cream colored, soft, sticky polymer.

The preferred concentration of the alkali silicate is about 1 part by weight of alkali silicate to 2 parts by weight of the allyl halide compound, then more allyl halide may be gradually added, and the polymerization continues. The presence of a small amount of a silicon acid and/or an organic amine, in the amount of 1% to 10% by weight, percentage based on weight of the alkali silicate, enhances the reaction to polymerize the mono-olefinic allyl type mono-halide compound.

A dry fine granular form of the alkali silicate is preferred. An aqueous solution or suspension of the alkali silicate may also be used.

The preferred method to produce poly (allyl halide allyl alcohol) polymer is to mix 1 part by weight of an alkali silicate with 1 to 2 parts by weight of a mono-olefinic allyl type mono-halide then to let the mixture set for 1 to 12 hours at 0° to 100° C in a closed system, thereby producing poly (allyl chloride allyl alcohol) polymer, alkali halide, and silicate. The poly (allyl chloride allyl alcohol) polymer is separated by adding a solvent and filtering off the polymer or adding water to the mixture and letting the polymer float to the top then recover it.

The preferred method to produce poly (allyl alcohol) polymer is to add an alkali metal hydroxide such as potassium or sodium hydroxide in the amount of 1 mol of the alkali metal hydroxide to each mol of halide present in the polymer and mix in water then to heat the mixture to 70° to 100° C. while agitating for 20 to 60 minutes, thereby producing an emulsion of poly (allyl alcohol) polymer. The polymer slowly floats to the top and may be recovered by decanting off the water, alkali metal halide and alkali silicate.

The preferred method to produce poly (allyl silicate allyl alcohol) polymer is to heat the mixture of poly (allyl halide allyl alcohol) polymer and alkali silicate to 70° C to 120° C while agitating at ambient pressure for 20 to 60 minutes, thereby producing poly (allyl silicate allyl alcohol) polymer. The polymer is recovered by adding water to the mixture then agitating until an emulsion is formed. The poly (allyl silicate allyl alcohol) polymer floats to the top and is recovered. Solvents may be used to recover the polymer.

The primary object of this invention is to provide a novel process to produce poly (allyl halide allyl alcohol) polymer. Another object is to produce poly (allyl alcohol) polymer. Another object is to produce poly (allyl silicate allyl alcohol) polymer. Another object is to produce polymers which are useful as adhesives, as intermediates in production of resins and foams, in impregnants, in molding powders, in paints, in varnishes, in laminates and in any of the commonly known products as is known in the arts.

DESCRIPTION OF PREFERRED EMBODIMENTS

The following examples describe in detail certain preferred embodiments of the process of my invention. These preferred processes may, of course, be varied as described above with similar results. Parts and percentages are by weight unless otherwise indicated.

EXAMPLE I

One part by weight of sodium silicate pentahydrate, fine granular, is mixed with 2 parts by weight of allyl chloride (3-chloropropene). The allyl chloride slowly polymerizes and reacts chemically with the sodium in the sodium silicate to produce poly (allyl chloride allyl alcohol) polymer. The poly (allyl chloride allyl alcohol) polymer is extracted from the sodium silicate and sodium chloride by adding a solvent, such as allyl chloride; the solvent is then evaporated, thereby recovering poly (allyl chloride allyl alcohol) polymer.

EXAMPLE II

One part by weight of dry potassium silicate granules are mixed with 2 parts by weight of allyl chloride. The mixture is heated to just below the boiling point of allyl chloride while agitating for 15 to 20 minutes. Within 1 to 12 hours the mixture turns light yellow in color and produces poly (allyl chloride allyl alcohol) polymer.

5 parts by weight of water are added to the mixture and 1 part by weight of potassium hydroxide flakes are added while agitating and heating the mixture at 70° to 100° C for 20 to 60 minutes, thereby producing poly (allyl alcohol) polymer. The polymer floats to the top and may be separated from the solution of potassium silicate and potassium chloride. The polymer may be emulsified with the aqueous solution of potassium silicate by using emulsifiers. This solution may be used as an adhesive for paper products.

EXAMPLE III

One part by weight of activated magnesium silicate is mixed with 2 parts by weight of 3-chloropropene, and the reaction is complete in 1 to 12 hours, thereby producing poly (allyl chloride allyl alcohol) polymer. The polymer may be separated from the magnesium silicate and magnesium chloride with a solvent such as allyl chloride or water. The water can be mixed with the magnesium silicate, and the polymer floats to the top and may be recovered. The magnesium silicate may be re-used in the process. The solvent may be evaporated from the solution of poly (allyl chloride allyl alcohol) polymer, thereby recovering a soft, thick, sticky, cream colored liquid.

EXAMPLE IV

One part by weight of sodium silicate, dry granular form, one part by weight methyl allyl chloride and one part by weight of allyl chloride are mixed and agitated for 15 to 30 minutes, at ambient temperature and pressure. The reaction is complete in 1 to 12 hours, thereby producing poly (allyl chloride-allyl alcohol-methyl allyl chloride-methyl allyl alcohol) polymer.

EXAMPLE V

One part by weight of dry granular sodium silicate, 0.1 part by weight of hydrated silica and 2 parts by weight of 3-chloropropene are mixed at ambient pressure and temperature. The reaction is complete in 1 to 12 hours, thereby producing poly (allyl chloride allyl alcohol) polymer.

EXAMPLE VI

One part by weight of dry granular sodium silicate, 0.1 part by weight of ethylenediamine, and 2 parts by weight of methyl allyl chloride are mixed at ambient temperature and pressure, thereby producing poly (methyl allyl chloride methyl allyl alcohol) polymer.

EXAMPLE VII 4 parts by weight of a fine silica and an aqueous solution containing 1 to 2 parts by weight of sodium hydroxide or potassium hydroxide are mixed. The mixture is then heated at 80° to 120° C. for 20 to 60 minutes at ambient or elevated pressure while agitating until the water evaporates, thereby producng a gray colored activated silica.

1 part by weight of the fine granular activated silica and 1 to 2 parts by weight of allyl chloride are mixed at ambient pressure. The chemical reaction is complete in 1 to 12 hours, thereby producing poly (allyl chloride allyl alcohol) polymer.

The mixture of the activated silica and poly (allyl chloride allyl alcohol polymer is then heated to 70° to 110° C. for 20 to 60 minutes, thereby producing poly (allyl alcohol allyl silicate) polymer.

EXAMPLE VIII 1 part by weight of fine granular calcium silicate with active silicic acid groups and 2 parts by weight of allyl chloride are mixed at ambient pressure. After the mixture has set for 1 to 12 hours the reaction is complete, thereby producing poly (allyl chloride allyl alcohol) polymer. The polymer is extracted from the mixture by use of a solvent such as allyl chloride. The allyl chloride is evaporated, thereby recovering a cream colored, thick, sticky poly (allyl chloride allyl alcohol) polymer.

EXAMPLE IX 1 part by weight of fine granular natural occurring silicate, containing active silicic acid radicals and alkali radicals such as talc, felspar, clay, Raolin, natrolite, etc., are mixed with 1 to 2 parts by weight of allyl chloride; the mixture is allowed to set for about 1 hour; then another 1 to 2 parts by weight of allyl chloride are added at ambient pressure. The chemical reaction is complete in 1 to 12 hours, thereby producing poly (allyl chloride allyl alcohol) polymer.

EXAMPLE X 1 part by weight of fine granular sodium silicate, 1 part by weight of fine granular magnesium silicate and 2 parts by weight of allyl chloride are mixed at ambient temperature. The chemical reaction is complete in 1 to 12 hours, thereby producing poly (allyl chloride allyl alcohol) polymer.

EXAMPLE XI 1 part by weight of activated silica as produced in Example 7, 1 part by weight of calcium silicate, containing active silicic acid radicals, and 2 parts by weight allyl bromide are mixed at ambient pressure and temperature. The chemical reaction is complete in 1 to 12 hours, thereby producing poly (allyl bromide allyl alcohol) polymer.

EXAMPLE XII

Allyl chloride is heated to above the boiling temperature and the vaporized allyl chloride is passed through a column of fine granular alkali silicate containing 1 part by weight of sodium silicate, 1 part by weight of magnesium silicate and 1 part by weight of activated silica as produced in Example VII, thereby producing poly (allyl chloride allyl alcohol) polymer. The unreacted allyl chloride acts as the solvent for the poly (allylchloride allyl alcohol) polymer. The polymer is recovered by evaporating the allyl chloride. The allyl chloride is passed back through the column of silicates.

EXAMPLE XIII 1 part by weight of fine granular potassium silicate, 2 parts by weight of water, 1 part by weight of a fine granular natural alkali silicate, containing active silicic acid radicals, 2 parts by weight of allyl chloride and 1 part by weight allyl alcohol are mixed at ambient pressure and temperature. The mixture is agitated for 1 to 12 hours, thereby producing poly (allyl chloride allyl alcohol) copolymer, a cream colored, thick, sticky product which slowly becomes a soft solid.

EXAMPLE XIV

About 1 part by weight of fine granular talc, 1 part by weight of activated silica as produced in Example VII and 4 parts by weight of allyl chloride are mixed thoroughly. The chemical reaction is complete in 1 to 12 hours, thereby producing poly (allyl chloride allyl alcohol) polymer.

The mixture is heated to 70° to 120° C. for 20 to 60 minutes, thereby producing poly (allyl silicate allyl alcohol) polymer. Water is added to the mixture and agitated, thereby producing an emulsion of water and polymer which is then filtered from the remaining silicate. The polymer gradually separates from the water and is recovered as a cream colored, thick, sticky polymer then gradually becomes a soft solid polymer.

EXAMPLE XV

One mol of sodium hydroxide and one mol of hydrated silica are mixed in an aqueous solution then heated to 70° to 100° C. for a few minutes, thereby producing a mono-sodium silicate aqueous solution.

About 1 part by weight of mono-sodium silicate in 2 parts by weight of water are mixed with 2 parts by weight of allyl chloride then agitated for 1 to 12 hours at ambient temperature and pressure, thereby producing an aqueous emulsion of poly (allyl chloride allyl alcohol allyl silicate) polymer and mono-sodium silicate.

This aqueous emulsion may be used as an adhesive for paper.

EXAMPLE XVI

One mol of potassium hydroxide and one mol of silicoformic acid are mixed in a warm aqueous solution, thereby producing an aqueous solution of mono-potassium silicoformic acid.

About 1 part by weight of mono-potassium silicate in 4 parts by weight of water and 2 parts by weight of allyl silicate are mixed then agitated at ambient pressure and temperature. An emulsifier such as soap or detergent is added in the amount of 1% to 5% by weight, percentage based on total weight of reactants and water. The reaction is complete in 1 to 12 hours, thereby producing an aqueous emulsion of poly (allyl chloride, allyl silicate allyl alcohol) polymer and monosodium silicoformic acid. This aqueous emulsion may be used as an adhesive for paper.

Although specific materials and conditions were set forth in the Examples, these were merely illustrative of preferred embodiments of my invention. Various other compositions, such as the typical materials listed above may be used where suitable. The reactive mixtures and products of my invention may have other agents added thereto to enhance or otherwise modify the reaction and products.

I claim:

1. The process for the production of poly (allyl halide allyl alcohol) polymer by the following steps:
   (a) mixing about one part by weight of an alkali silicate with about 1 to 2 parts by weight of a mono-olefinic allyl type mono-halide;
   (b) agitating said mixture in a closed system and keeping the temperature between 0° and 100° C. for about 1 to 12 hours at ambient pressure, thereby
   (c) producing poly (allyl halide allyl alcohol) polymer.

2. The process according to claim 1, wherein the alkali silicate is selected from the group consisting of alkali metal silicates, alkaline earth metal silicates and natural occurring alkali silicates with free silicic acid radicals and mixtures thereof.

3. The process according to claim 1, wherein the mono-olefinic allyl type mono-halides with the essential grouping of atoms may be represented as

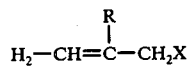

wherein R is a hydrogen or a $C_1$ to $C_4$ alkyl group wherein X represents a halogen atom.

4. The process according to claim 1, wherein the mono-olefinic allyl type mono-halide is selected from the group consisting of allyl chloride, allyl bromide, crotyl chloride, crotyl iodide, beta-methylallyl chloride, beta-methylallyl bromide, methyl vinyl carbinyl chloride, methyl vinyl carbinyl fluoride, alpha-dimethylallyl chloride, beta-cyclohexylallyl chloride, cinnamyl chloride, beta-ethylcrotyl chloride, beta-phenylallyl bromide, alpha-dicyclohexylallyl chloride, beta-propylallyl iodine, beta-phenylallyl chloride, beta-cyclohexylallyl fluoride, 2-chloromethyl butene-1, 2-chloromethyl pentene-1, 2-chloromethyl hexene-1 and mixtures thereof.

5. The process according to claim 1, wherein the mono-olefinic allyl type mono-halide is selected from the group consisting of allyl chloride, allyl bromide, methylallyl chloride and mixtures thereof.

6. The process according to claim 1, wherein 1 part by weight of allyl alcohol is added in step (a) of claim 1, thereby producing poly (allyl halide allyl alcohol) co-polymer.

7. The process according to claim 1, wherein 1% to 10% by weight of a fine granular hydrated silica, percentage based on the weight of the reactants, is added in step (a) of claim 1.

8. The process according to claim 1, wherein additional steps are added following step (c) of claim 1;
   (d) adding one part by weight of an alkali metal hydroxide, selected from sodium hydroxide and potassium hydroxide, in water to the said poly (allyl halide allyl alcohol) polymer.
   (e) agitating while heating to 70° to 100° C. for 20 to 60 minutes, thereby
   (f) producing a poly (allyl alcohol) polymer, alkali metal salt and alkali silicate.
   (g) recovering the poly (allyl alcohol) by letting the said polymer float to the top of the water, then decanting off the water, alkali halide and alkali silicate.

9. The process according to claim 1, wherein additional steps are added following step (c) of claim 1;
   (d) heating the mixture of alkali silicate, alkali halide and poly (allyl halide allyl alcohol) polymer to 70° to 120° C. while agitating at ambient pressure for 20 to 60 minutes, thereby producing poly (allyl silicate allyl alcohol) polymer.

10. The product, poly (allyl silicate allyl alcohol) polymer, as produced by the process of claim 9.

* * * * *